Figure 1:
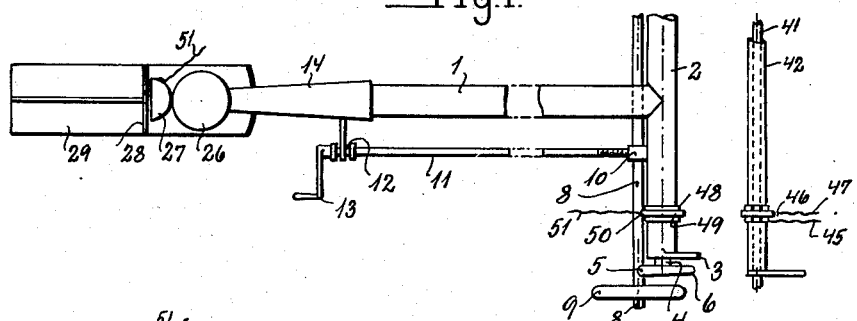

Jan. 7, 1936.    H. TASTENHOYE    2,027,127
ONE WHEELED TRAILER FOR AUTOMOBILES AND SIMILAR VEHICLES
Filed Oct. 20, 1933    2 Sheets-Sheet 1

INVENTOR:-
Hubert Tastenhoye
BY
ATTORNEYS

Jan. 7, 1936.  H. TASTENHOYE  2,027,127
ONE WHEELED TRAILER FOR AUTOMOBILES AND SIMILAR VEHICLES
Filed Oct. 20, 1933  2 Sheets-Sheet 2
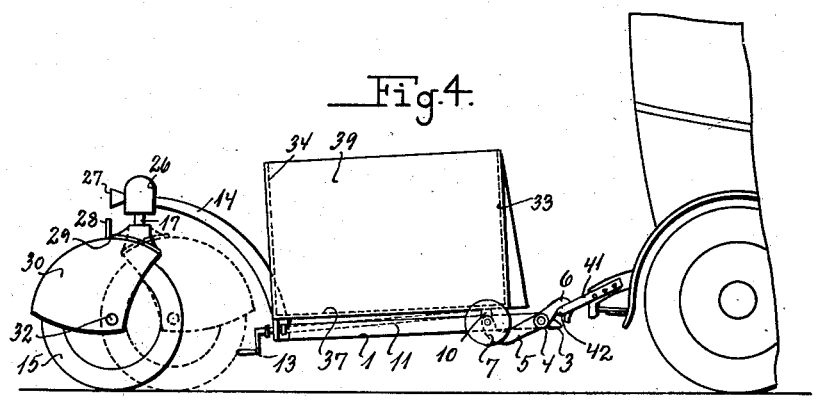
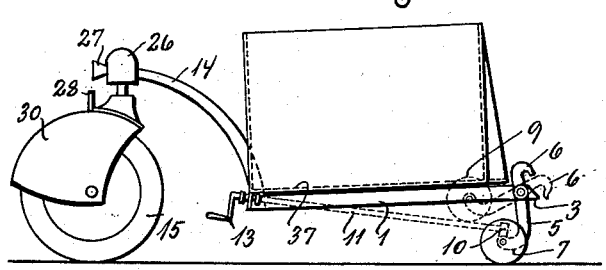
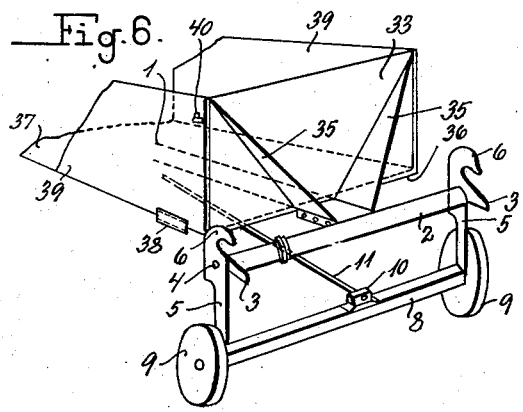

Patented Jan. 7, 1936

2,027,127

UNITED STATES PATENT OFFICE 2,027,127

ONE WHEELED TRAILER FOR AUTOMOBILES AND SIMILAR VEHICLES

Hubert Tastenhoye, Vilvorde, Belgium

Application October 20, 1933, Serial No. 694,477
In Belgium October 24, 1932

9 Claims. (Cl. 280—33.4)

It has been proposed before to construct one-wheeled trailers for automobiles and other vehicles adapted to run on ordinary roads.

In one-wheeled trailers heretofore constructed the centre of gravity of the underframe of the trailer and the carriage body which is supported partly on the supporting wheel and partly on the towing vehicle, has been disposed at the same level or above the point of support of the trailer on supporting wheel. The consequence thereof, the trailer when empty as well as when loaded is inclined to reel or wobble very much during the travel, and also produces very high torsional stresses in the members serving to connect the trailer and the towing vehicle, since the trailer has a tendency to tilt, especially at curves. Owing to the relatively high position of the centre of gravity, these known trailers have further a great tendency to reel. It has heretofore been attempted to counteract this tendency to reel by the insertion of dampening means between the trailer and the vertical pivot pin of the fork in which the supporting wheel of the trailer is journalled, the said dampening means counteracting by friction any rotary motion of the said pin and of the fork of the supporting wheel.

Such dampening means, however, are not able to suppress sufficiently the tendency of the trailer to wobble when the centre of gravity is disposed at the said relatively high position.

The present invention has for its object to produce a trailer in which the tendency to wobble during travel is reduced to such an extent that the same is practically negligible. According to the invention this result is attained by disposing the part of the trailer which is situated between the towing vehicle and the supporting wheel of the trailer, and which is supported on the fork of the said wheel and the said vehicle, so that the centre of gravity thereof will be situated lower than the point of support of the trailer on the said fork.

In the same manner, as for the trailers heretofore constructed, there is inserted between the trailer itself and the pivot pin for the fork in which the supporting wheel of the trailer is journalled, a dampening device adapted to prevent any wobbling of the fork and the supporting wheel journalled therein. Owing to the low position of the centre of gravity, this dampening device will be considerably more efficient than in the previously constructed one-wheeler trailer.

In order that the pivot pin for the said fork may not be exposed to too violent mechanical stresses, such as those due to variations in the direction of motion, it is suitable, although not exactly necessary, to journal the pin in such a manner that the pin, besides being able to rotate about a vertical axis, will also be able within certain limits to oscillate in a vertical plane, in the transverse as well as in the longitudinal direction of the trailer.

The fork for the supporting wheel of the trailer is suitably journalled in a post provided at the rear end of the trailer, and may for instance comprise a bent plate encircling the foremost and upper part of the supporting wheel.

It will further be suitable to construct the fork in such a manner that the vertical axis of rotation of the same does not intersect the axis of rotation of the supporting wheel.

The trailer is coupled, in any desired manner, to the towing vehicle by means of members serving to provide a rigid connection between the two vehicles with respect to rotation in the horizontal plane and in respect to rotation in vertical planes perpendicular to the longitudinal axis of the trailer. Furthermore, in order to prevent oscillating motions unavoidably occasioned by the towing vehicle during the travel which motions might possibly expose the coupling members to injurious mechanical stresses, the connection should be capable of yielding in the vertical direction, for instance by providing a link connection adapted to swing about a horizontal axis.

According to the invention the means provided on the trailer for the purpose of connecting the same to the towing vehicle consist of two arms which are pivotally mounted on the trailer and point downward and carry supporting wheels for the front end of the trailer when uncoupled and said means are automatically moved into the coupling position, or are automatically locked in the coupling position, when the said arms with the supporting wheels attached thereto are swung up from the ground.

In order that the downward pressure exerted on the pulling vehicle by the front end of the trailer may not tend to reduce appreciably the adhesion between the road surface and the front wheels of the vehicle, which might impede or render uncertain the steering of the vehicle to some extent, it is desirable to let the point or points at which the pressure from the trailer is transmitted to the pulling vehicle, be situated as close as possible behind, or better at or in front of, the vertical plane through the rear-wheel axle of the pulling vehicle.

If the trailer is used in connection with an automobile, it will be necessary to provide an automatic electric connection between a rear lantern disposed on the trailer and the lantern switch and battery of the vehicle, when the trailer is coupled to the automobile. According to the invention this result is attained by means of a special electrical contact device combined with the coupling means for the two vehicles and governing the circuits of the two rear lanterns.

Figure 2:
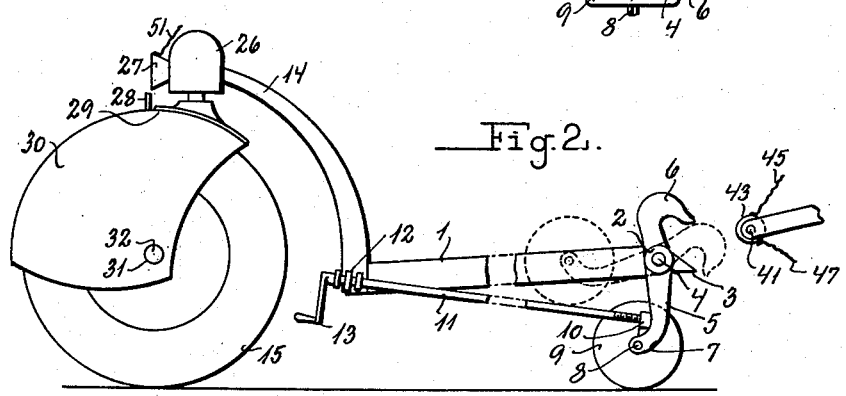
Figure 3:
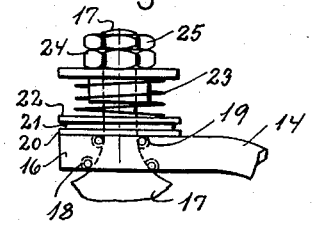

The further details of the invention appear from the following description of the construction of one-wheeled trailers shown in the drawings, in which Fig. 1 shows, diagrammatically, the principal parts of a trailer, in top plan view, Fig. 2 shows the same in side elevation, Fig. 3 shows on an enlarged scale a side elevation of the pivot pin on the fork of the supporting wheel, Fig. 4 shows a side elevation of the trailer attached to an automobile, the dotted lines showing the position taken by the supporting wheel during backing, Fig. 5 shows a side elevation of the trailer detached, and resting at the front on the small supporting wheels, Fig. 6 shows, in perspective view, the front part of the trailer, in a preferred construction.

In Figs. 1 and 2 the frame of the trailer is shown to consist of a longitudinal central girder 1, which may be a rather large tube, the front end of which is rigidly connected to a tubular or otherwise shaped transverse bar 2, the two equally long arms of which terminate each in an arm 3 parallel to the girder 1 and in a bearing member 4 in line with the transverse bar. The bearing members 4 are fitted with pivoted arms 5 shaped at the top as coupling hooks 6 and, at the bottom, as pin bearings 7 adapted to support a shaft 8 carrying small wheels 9. A ring, collar, or other suitable member free to rotate about the shaft 8 supports a nut 10 engaged by the threaded part of a rod 11, which at the rear end of the trailer is supported, with a certain play, in a collar or the like 12 on the girder 1. The rod 11 can be rotated by means of a crank handle 13 or by a hand wheel or the like attached to the rear end of the rod.

The rear end of the girder 1 is rigidly connected to the arm 14, which extends upwardly, and is bent in the shape of a gooseneck on a radius larger than that of the adjustable rear wheel of the trailer, and said arm 14 terminates at an adjusting head 16, see Fig. 3. In the said head an adjusting cone 17 is journalled by means of two ball race bearings 18 and 19.

The cone is braked to a certain extent by a suitable device, which in the construction shown consists of a plate 20 fitted with a brake lining 21 and attached to the adjusting head 16, a freely movable disc 22 being maintained pressed against the said lining by means of spring 23 the tension of which can be adjusted by means of a nut 24 with a lock-nut 25.

In the operating state the entire arrangement of parts shown in Fig. 3 is covered with a casing 26 or the like, which supports a rear lantern 27 and a number plate 28. The adjusting cone is attached at the bottom to a fork 29, preferably made from two hammered pieces of plate 30, which are fitted with holes 31 for holding the axle 32 of the adjustable wheel 15. The fork 29 is arranged in such a manner that the axle 32 will normally be situated somewhat to the rear of the axis of the adjusting cone 17.

The body of the trailer consists mainly of two approximately vertical plates 33 and 34, see Fig. 4, made from sheet iron and fitted with diagonally disposed reinforcing ribs 35, see Fig. 6, which are attached to the girder 1, and plates 33, 34, are flanged on their lower ends to form supports 36 for the floor 37 of the vehicle to which the side walls 39, 39 are attached by means of hinges 38 or the like. The said side walls are arranged to be swung outward, and are connected to the front and rear plates 33 and 34 of the body in any suitable manner, for instance by means of wedge-shaped tenons 40 and eyelets as shown.

In order that the trailer may be attached to a vehicle, the body of the latter must be fitted, at the rear end and slightly above the front axle 8 of the trailer, with a transverse bar 41 or the like, around which the hooks 6 of the trailer can engage.

The manner in which the transverse bar 41 is attached to the frame of the vehicle forms no part of the invention, and should be determined in accordance with the nature of the underframe of the vehicle concerned. It is to be noted, however, that the transverse bar 41 should suitably be encircled by a freely rotatable sleeve or bushing 42 or the like, whereby the hooks 6 will be prevented from wedging themselves on the transverse bar. When the trailer is to be attached, it is placed behind the vehicle intended to tow the same, in such a manner that the arm 3 of the trailer comes below the transverse bushing 42, after which the crank handle 13 is turned in a clock-wise direction, so that the threaded part of the rod 11 is screwed into the nut 10, whereby the arms 5 and thereby the small wheels 9 are swung upwardly and rearwardly, while the hooks 6 are moved forwardly and downwardly so as to engage the bushing 42 of the transverse bar 41. The rotation of the crank handle is now continued, until the bushing 42 is entirely enclosed between the arm 3 and the hooks 6, and at the same time the wheels 9 will be moved rearwardly and upwardly towards the body of the trailer. The trailer will then merely be supported at the front by the hooks 6 and by the adjustable wheel 15 at the rear. In this position the trailer will in every respect form a unit together with the pulling vehicle, the motion of which it will follow exactly, as the adjustable wheel 15 will perform automatically all the motions required for following the momentary direction of travel. The braking device on the adjusting head 16 will prevent any too violent turnings and irregular motions in consequence of any casual actions such as vibrations and the like. If the vehicle is backing, the wheel 15 will continue to rotate about the axis of the cone 17, until it has reached the position shown by dotted lines in Fig. 4, in which position it will remain fully adjustable, as long as the backing is continued, and subsequently when the vehicle again runs forward, the trailer will again enter into the normal position shown by full lines.

The trailer is detached simply by rotation of the crank 13 in a counter clock-wise direction, whereby the coupling hooks 6 will be raised and the supporting wheels 9 will be lowered, until the trailer becomes perfectly free of the towing vehicle, and will again be resting on the wheels 9 at the front, in such a manner that it forms an independent movable part.

Having now particularly described and ascertained the nature of my said invention and in what manner the same is to be performed, I declare that what I claim is:—

1. A trailer for automobiles and other vehicles consisting of a frame, a post rigidly connected to the rear end of said frame, a bearing at the upper end of said post, a fork, a pivot pin on said fork having a conical portion located in said bearing, a running wheel mounted in said fork, a collar on the free end of said pin, a spring surrounding the pin and interposed between said collar and said bearing and exerting a pressure on the pin adapted to maintain the conical portion thereof in engagement with the bearing, so as to counteract reeling motions of the fork and the supporting wheel.

2. In a trailer for vehicles, a frame adapted to be attached at one end to a vehicle; a substantially vertical post at the opposite end of the frame, a bearing on said post; a fork having a pivot pin journaled in said bearing; means for permitting the pivot pin to have a restricted universal rocking movement with respect to the post; and a running wheel mounted in the fork on an axle which is disposed substantially in the plane of the frame.

3. In a trailer as set forth in claim 2, said permitting means comprising a substantially conical portion on the pivot pin engaging the bearing, and means for yieldably maintaining the conical portion in engagement with the bearing to counteract reeling motions of the fork.

4. In a trailer as set forth in claim 2, said permitting means comprising a substantially conical portion on the pivot pin; upper and lower ball races in the bearing adapted to engage the conical portion; and means for yieldably maintaining the conical portion in engagement with the ball races to counteract reeling motions of the fork.

5. In a trailer as set forth in claim 2, the fork in which the supporting wheel is journaled consisting of a bent plate enclosing partly the upper and rearmost portion of the running wheel.

6. In a trailer for automobiles and other vehicles, a frame having a bearing; a fork; a pivot pin on said fork having a conical portion located in said bearing so as to have a substantial universal movement with respect to the bearing; means for yieldably maintaining the conical portion in engagement with the bearing to counteract reeling motions of the fork; and a running wheel mounted in said fork.

7. In a trailer for automobiles and other vehicles, a frame having a bearing; a fork; a pivot pin on said fork having a conical portion located in said bearing so as to have a substantial universal movement with respect to the bearing; upper and lower ball races in the bearing engaging the conical portion; means for yieldably maintaining the conical portion in engagement with the ball races to counteract reeling motions of the fork; and a running wheel mounted in said fork.

8. In a trailer for automobiles and other vehicles, a frame having a bearing; a fork; a pivot pin on said fork having a conical portion located in said bearing; a running wheel mounted in said fork; a collar on the free end of said pin, and a spring surrounding the pin and interposed between said collar and bearing and exerting a pressure adapted to maintain the conical portion thereof in engagement with the bearing so as to counteract reeling motions of the fork and the running wheel.

9. In a trailer for automobiles and other vehicles, a frame having a bearing; a fork; a pivot pin on said fork having a conical portion located in said bearing; upper and lower ball races in the bearing engaging the conical portion; a running wheel mounted in said fork; a collar on the free end of said pin; and a spring surrounding the pin and interposed between said collar and said bearing and exerting a pressure adapted to maintain the conical portion in engagement with the bearing so as to counteract reeling motions of the fork and the running wheel.

HUBERT TASTENHOYE.